Figure 1:
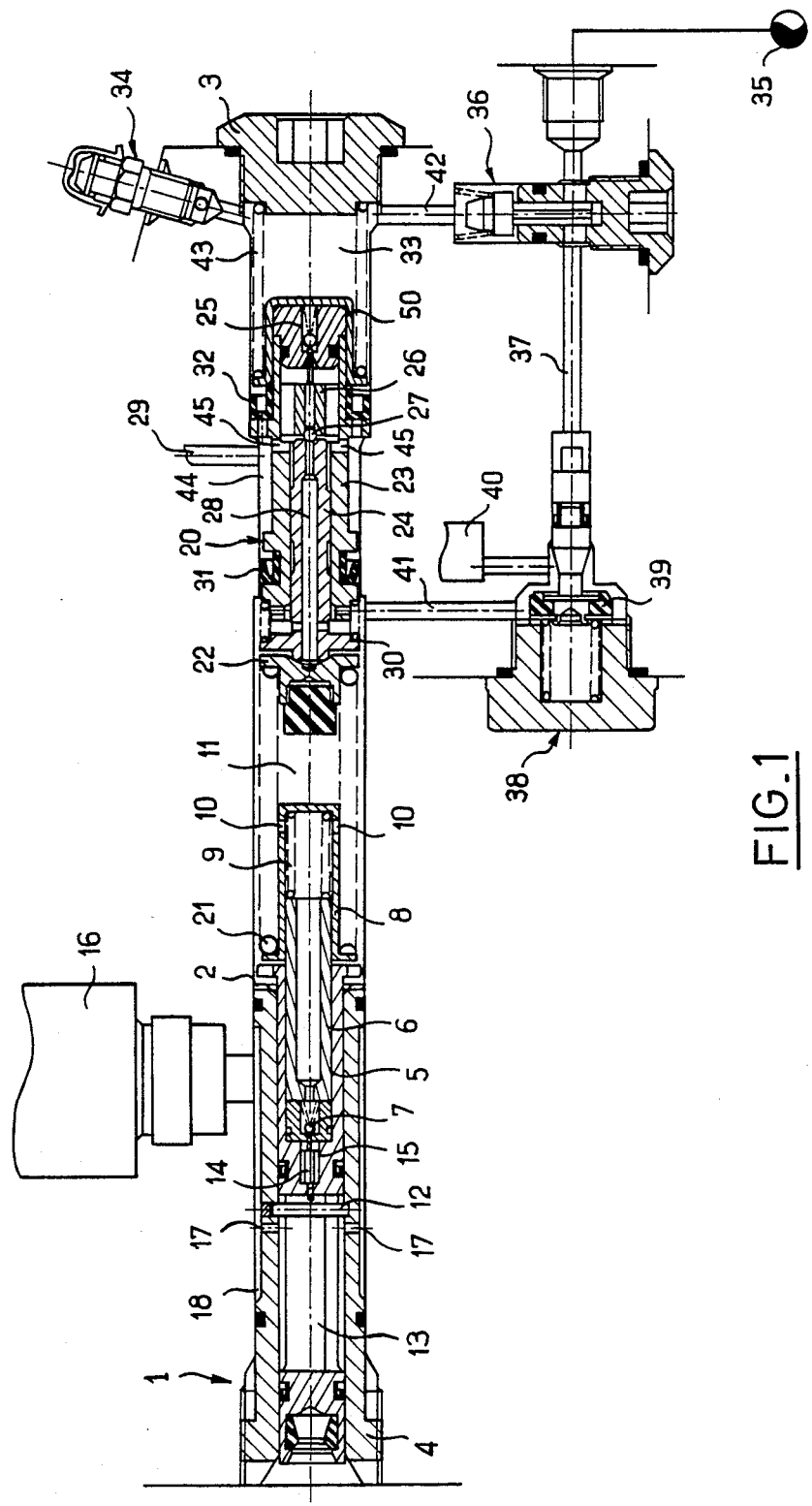

United States Patent [19]

Douillet et al.

[11] Patent Number: 4,858,438
[45] Date of Patent: Aug. 22, 1989

[54] HYDRAULIC BOOSTER DEVICE FOR BRAKING CIRCUIT

[75] Inventors: Christian Douillet, Puteaux; Joël Vasselet, Chelles, both of France

[73] Assignee: Bendix France, Drancy, France

[21] Appl. No.: 170,481

[22] Filed: Mar. 18, 1988

[30] Foreign Application Priority Data

Mar. 31, 1987 [FR] France ................. 87 04471

[51] Int. Cl.$^4$ .................. B60T 17/00; B60T 11/32
[52] U.S. Cl. .......................... 60/566; 60/582
[58] Field of Search ............ 60/565, 566, 582, 585; 91/460, 280

[56] References Cited

U.S. PATENT DOCUMENTS

| | | | |
|---|---|---|---|
| 3,514,163 | 5/1970 | MacDuff | 60/565 X |
| 4,181,371 | 1/1980 | Adachi | 60/582 X |
| 4,622,814 | 11/1986 | Kervagoret | 60/555 |
| 4,637,208 | 1/1987 | Keruagoret | 60/547.1 |
| 4,651,528 | 3/1987 | Carré et al. | 60/556 |
| 4,705,324 | 11/1987 | Kervagoret | 60/545 X |
| 4,706,460 | 11/1987 | Kervagoret | 60/582 X |
| 4,729,223 | 3/1988 | Kervagoret | 60/566 |

FOREIGN PATENT DOCUMENTS

| | | |
|---|---|---|
| 0210096 | 1/1987 | European Pat. Off. . |
| 2360140 | 6/1975 | Fed. Rep. of Germany . |
| 2290334 | 6/1976 | France . |
| 2074274 | 10/1981 | United Kingdom . |

*Primary Examiner*—Robert E. Garrett
*Assistant Examiner*—Mark A. Williamson
*Attorney, Agent, or Firm*—Larry J. Palguta; Ken C. Decker

[57] ABSTRACT

The hydraulic booster device controls a ball valve (25) to establish a communication between a source of fluid at high pressure (35) and a braking circuit (29) during a normal braking. In the event of failure of the high pressure source (35), the braking is ensured by pressurizing of the fluid contained in a chamber (33) by a piston mechanism (20), and transfer of this fluid into the circuit (29). An additional useful volume of brake fluid is supplied to the circuit (29) by fluid expelled from the chamber (11) by the penetration of the plunger (5) into this chamber, after the piston mechanism (20) has come to a stop against the end fitting (3). Application to a hydraulic braking circuit for automobile vehicle.

11 Claims, 2 Drawing Sheets

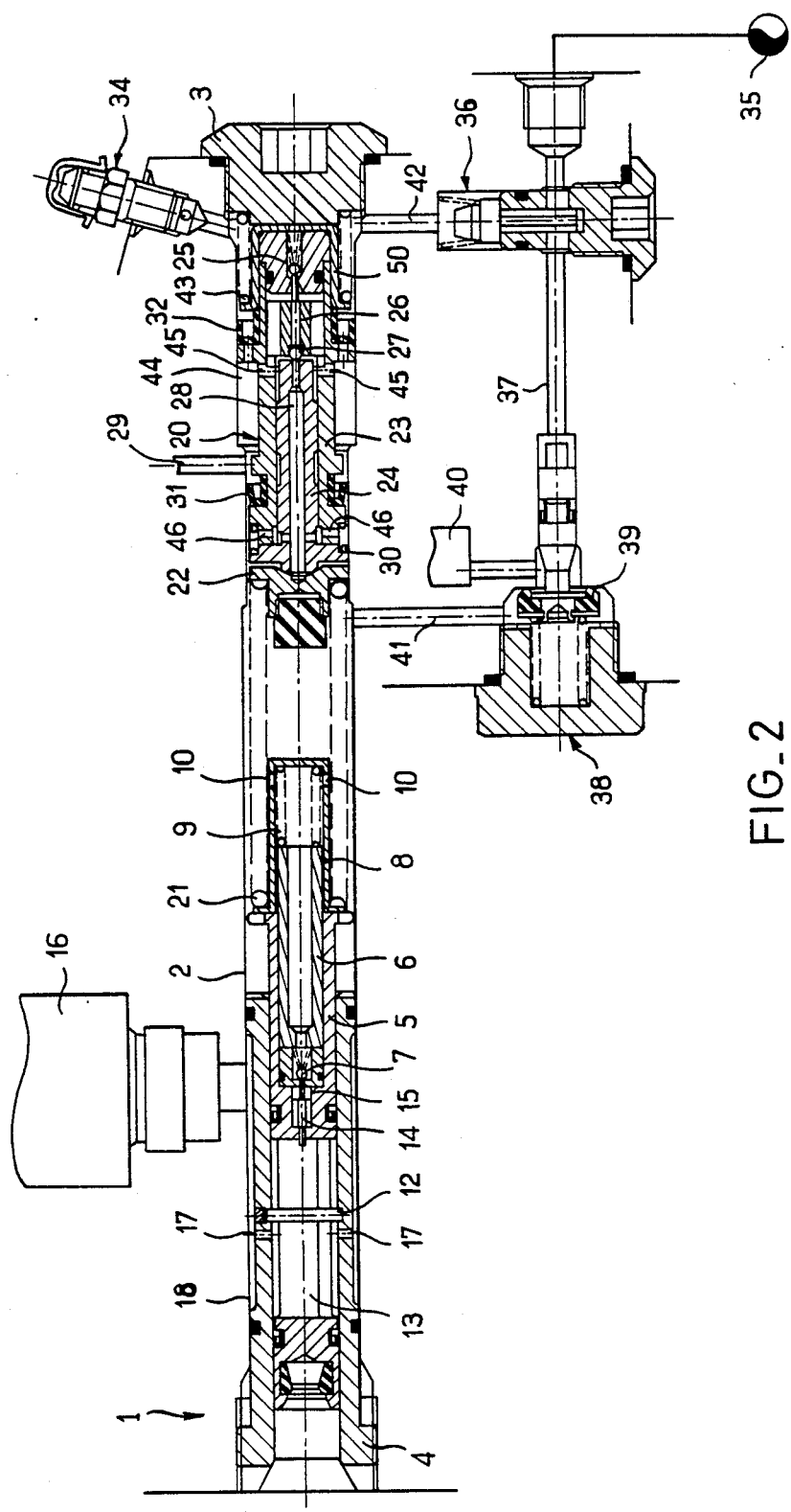
FIG_2

HYDRAULIC BOOSTER DEVICE FOR BRAKING CIRCUIT

The present invention relates to a hydraulic booster device and, more particularly, to such a device designed for a braking circuit of composite hydrodynamic and hydrostatic operation.

French Patent Application No. 2,584,356 in the name of the applicant relates to a hydraulic booster device comprising a body provided with a bore in which a piston means movable under the effect of the actuation of a brake pedal is slideably mounted between a first position making a first chamber connected to a braking circuit communicate with a low pressure reservoir and isolating this chamber from a source of high pressure fluid, and a second position isolating the chamber of the low pressure reservoir and making it communicate with the higher pressure source. The piston means is movable under the effect of the actuation of the brake pedal when there is a failure in the high pressure circuit, to create a pressure in a second chamber connected to the braking circuit. The working surface of the piston means is equal to the section of the bore, which enables a large useful volume of brake fluid to be moved, in the event of failure of the high pressure circuit.

In the hydraulic booster device of the application of the aforementioned French patent, the piston means is coupled to a plunger connected to the brake pedal by a compression spring located in a third chamber connected to a low pressure reservoir. In the event of failure of the source of high pressure fluid, this third chamber is isolated from the braking circuit and, in consequence, the fluid displaced by the plunger in this chamber discharges into the low pressure reservoir. This volume of fluid is thus lost to the braking circuit. Such a situation is acceptable when the useful volume of fluid is sufficient to ensure a correct braking for a vehicle of a given weight. It may be wished to increase the efficiency of the braking for a heavier vehicle in the event of failure of the source of high pressure fluid, by increasing the useful volume of brake fluid without augmenting the overall dimensions of the hydraulic booster device.

The object of the present invention is to construct a hydraulic booster device of the type described above and improved in that the useful volume of brake fluid is increased, in the event of failure of the source of high pressure fluid, without augmenting the overall dimensions of the hydraulic booster device.

This object of the invention is achieved with an hydraulic booster device for a braking circuit, comprising a body drilled with a bore in which slide coaxially a plunger controlled by a brake pedal and a piston means located between first and second chambers containing a brake fluid, the first chamber having a spring which maintains the plunger and the piston means separated one from the other, the first and second chambers being connected respectively to source of low pressure and high pressure fluid, by first and second valve means respectively, third and fourth valve means being interposed between the first and second chambers, and a braking circuit, the device characterized in that the high pressure source controls the opening of the first and second valve means, these means closing themselves in the event of failure of this source to isolate the first chamber from the low pressure source and the second chamber from the high pressure source, the second chamber then emptying, in the event of braking, into the braking circuit due to the action of the piston means displaced by the translation of the plunger transmitted to this means by the spring and in that the third valve means opens once the second chamber is empty to permit the injection into the braking circuit of a volume of brake fluid expelled from the first chamber by the continuation of movement of the plunger due to the action of the brake pedal.

In the attached drawings, given as an example only:

FIG. 1 is a view in axial cross-section of the hydraulic booster device according to the invention, the various members of this device being arranged in the positions that they occupy during a normal braking, and FIG. 2 is a view, similar to that of FIG. 1, which shows the members of the device according to the invention in the positions that they occupy during a braking when a failure exists in the source of high pressure fluid.

Reference is made to FIG. 1 where it appears that the hydraulic booster device for a braking system according to the invention comprises a body 1 having a main bore 2 blanked off at one end by a closing end fitting 3. A sleeve 4 is mounted fixed to the other end of the body 1 in which a plunger 5 designed to be connected to a brake pedal (not shown) is sealingly and slideably mounted. The plunger 5 comprises a coaxial passage 6 closed to the plunger at its inner end by a valve means such as a ball and spring valve 7. The other end of the passage is covered by a cap 8 which encloses a spring 9 working in compression between the bottom of this cap and the end of the passage 6. The cap 8 is drilled with holes 10 which let the inside of the cap communicate with a first chamber 11 of the bore 2. A pin 12 integral with the sleeve 4 passes through an axial slot 13 hollowed out in the part of the plunger 5 which is on the left on FIG. 1. A needle-pointed core 14 is movable in an axial recess 15 of the plunger, this core being integral with the two axial needles arranged to interact respectively with the pin 12 and the ball of the valve 7. In the rest position, no action being applied to the brake pedal, the plunger 5 is in its position at the extreme left, as seen in the figure, and, in this instance, the pin 12 acts on the needle-pointed core 14 such that this opens the ball valve 7 to establish a communication between the first chamber 11 and a reservoir of low pressure brake fluid 16 via the passage 6, the ball valve 7, channels 17 drilled in the sleeve 4 and an annular chamber 18 located between the sleeve 4 and the wall of the bore 2, to communicate with the reservoir 16.

As soon as a pressure is exerted on the brake pedal, the plunger 5 moves to the right and the needle-pointed core 14 then moves away from the pin 12 which has the effect of allowing the ball valve 7 to close under the pressure of the spring which loads the ball, because the needle in conjunction with the core 14 exerts no more pressure on this ball. The communication between the first chamber 11 and the low pressure brake fluid reservoir 16 is thus cut off.

The plunger 5 is connected to a piston means 20 via a spring 21 working in compression. This spring 21 is located in the first chamber 11 and presses with its ends respectively on the bottom of the cap 8 in conjunction with the plunger 5 and on a thrust pad 22 which rests coaxially on the piston means 20. The piston means 20 comprises essentially a sleeve 23 in which a slide valve 24 slides. The sleeve 23 is closed at its right hand end (as seen in FIG. 1) by a valve means such as a ball and spring valve 25. The sleeve again receives a coaxial needle-pointed core 26 movable in a chamber of the sleeve arranged between the ball valve and the right hand end of the slide valve 24 (as seen in FIG. 1). This core 26 has a needle on the axis of the bore 2, this needle being able to push the ball of the valve 25 back against the action of a spring which loads this ball towards a closed position of the valve. The needle-pointed core again has a valve means such as a ball 27 which is able to close off the end of a channel 28 drilled in the slide valve 24 to make the chamber 11 communicate with a braking circuit shown diagrammatically at 29, as will be explained in more detail in what follows. A spring 30 tends to cause the slide valve 24 to come out of the sleeve 23. Rubber cups 31 and 32 are fitted between the sleeve 23 and the wall of the bore 2.

The right hand end of the piston means 20 (as seen in FIG. 1) is movable in a second chamber of brake fluid 33, limited in the bore 2 between this end and the closing end fitting 3. A bleed screw 34 provides access to this chamber 33.

A spring 43 located in the chamber 33 tends to push the piston means 20 away from the end fitting 3. The stiffnesses of the springs 43, 30, 21 and 9 increase in this order and, in a particular embodiment of the invention, are approximately equal to 0.36; 0.4; 2.3 and 6 kgf/mm respectively.

A source of high pressure brake fluid shown diagrammatically at 35, supplies the chamber 33 via a valve means such as a non-return valve 36. This source 35 is also connected by a passage 37 to a valve means formed by a valve 38. This valve comprises a head 39 whose position of opening or of closing is controlled by the source of high pressure 35. When the source of high pressure 35 functions normally, this valve head leaves open a communication between a low pressure brake fluid reservoir 40 and the first chamber 11 via a passage 41. In the event of failure of the high pressure source 35, the head of the valve 39 shuts on its seat and the communication between the low pressure reservoir 40 and the chamber 11 is cut off.

In the same way, when the source of higher pressure fluid 35 functions normally, the non-return valve 36 is lifted from its seat by the pressure of the fluid coming from the source 35 and this fluid may then enter the second chamber 33 via a passage 42. In the event of failure of the source 35, the non-return valve falls back onto its seat and this communication is cut off.

Thus the device according to the invention comprises the first, second, third, fourth and fifth valve means formed by the members referenced 38, 36, 27, 25 and 7 respectively.

The operation of the hydraulic booster device according to the invention during a braking when the source of high pressure brake fluid functions normally will now be described. The driver having pressed the brake pedal, the plunger 5 moves to the right (as seen in FIG. 1) which has the effect of moving the needle-pointed core 14 away from the pin 12, so as to eliminate in this way the pressure exerted by this core on the ball of the valve 7 which then closes to cut off all communication between the first chamber 11 and the reservoir 16. The valve 38 then being open, the fluid pressure contained in the first chamber 11 is equal to that of the fluid in the low pressure reservoir 40 communicating with this chamber. On this occasion, it will be noted that the two reservoirs 16 and 40 could form one only, due to a passage connected between the valve 38 in place of the reservoir 40 and the reservoir 16.

The movement of the plunger 5 to the right is transmitted to the piston means 20 by the spring 21. Under the thrust thus received by the thrust pad 22, the slide valve 24 also moves to the right pushing back the ball 27 and the needle-pointed core which then lifts the ball of the valve 25 off its seat so establishing a communication between the chamber 33 full of high pressure fluid and the braking circuit 29. The high pressure fluid from the chamber 33 is in fact able to pass into the braking circuit 29 by passing through the valve 25, by passing round the needle-pointed core 26 and entering, by passages 45, an annular chamber 44 surrounding the sleeve 23 and connected to the circuit 29. The hydraulic booster device according to the invention thus controls the admission of a brake fluid under high pressure into the braking circuit 29 to ensure a boosted braking of the vehicle, like a normal method of working. It will be noted that the high pressure fluid then creates a reaction on the slide valve 24, a reaction which is opposed by the springs 9 and 21 whose action ensures a good "pedal feel" for the driver.

When the brakes are released, the load on the plunger 5 is eased, which allows the piston means 20 to return to the left. The valve 25 then closes whereas the channel 28 is freed because the ball 27 lifts off from the end of this channel. The pressurized fluid in the chamber for the needle-pointed core 26 is thus free to pass into the channel 28 and the chamber 11 to return to the low pressure reservoir 40. If the releasing load on the brake pedal stabilizes itself, the ball 27 closes the channel 28 due to the action of the various springs and creates a corresponding pressure in the braking circuit 29 of the vehicle.

Reference is now made to FIG. 2 to explain the working of the booster device according to the invention, in the event of failure of the source of high pressure fluid 35. In this hypothesis, the pressure falling at the outlet of this source, the non-return valve 36 closes to thus isolate the second chamber 33 from the high pressure source. Simultaneously the valve 38 also closes due to the lowering of the pressure in the channel 37. The communication of the chamber 11 with the low pressure reservoir 40 is thus cut off.

In these conditions, if the driver presses on the brake pedal, the translation of the plunger 5 towards the right which follows has the effect of closing the ball valve 7 and of opening the ball valve 25, as for normal working. Due to the removal of the high pressure in the chamber 33, the translation of the plunger 5 towards the right will be transmitted entirely by the spring 21 to the piston means 20, which will compress the spring 43 located in the chamber 33 until a cap 50 of the ball valve 25 comes into contact with the closing end fitting 3. The fluid thus displaced in the chamber 33 by the penetration of the piston 20, escapes via the ball valve 25, open, towards the braking circuit 29 by passing round the core 26 to then penetrate into the annular chamber 44 via the passages 45. Thus the volume of displaced fluid forms a part of the useful volume which will serve to make the pressure in a braking circuit increase in spite of the failure of the source of high pressure fluid.

In accordance with an essential feature of the hydraulic booster device of the present invention, the volume of useful fluid is added to the increase in the rise in pressure in the braking circuit 29, in the event of failure of the high pressure source 35, by authorizing a transfer of fluid from the first chamber 11 towards this circuit, even though the piston means 20 is in contact against the end fitting 3. In fact, the driver continues to exert a pressure on the brake pedal, the translation of the plunger towards the right continues against the action of the spring 21 by thus displacing the fluid in the chamber 11, fluid which is unable to rejoin the low pressure reservoirs 16, 40 due to the closure of the ball valve 7 and the valve 38. On the other hand, this fluid is able to rejoin the braking circuit 29 by passing through the passages 46 drilled in the sleeve 23 and the channel 28 hollowed out in the slide valve 24, the ball 27 not closing off the end of this channel. Furthermore, the pressurized fluid from the chamber 11 may also pass between the sleeve 23 and the bore 2 to make the lip of the cup 31 bend and thus enter the braking circuit by this other passage. This transfer of fluid from the chamber 11 to the braking circuit 29 may continue until the cap 8 of the plunger 5 just presses on the thrust pad 22 of the piston means 20.

So, due to the invention, in the event of failure of the high pressure source 35, the volume of fluid useful to the increase of the pressure in the braking circuit which results from the emptying of the chamber 33 under the action of the piston means 20, increases by a substantial volume of fluid from the chamber 11. This beneficial result for braking safety in the event of failure of the high pressure source is achieved by isolating the volume of fluid contained in the chamber 11 from the low pressure reservoir of reservoirs, by the closing of the valve means 7 and 38 and by establishing a communication between the chamber 11 and the braking circuit, whereas the isolation of the chamber 33 in relation to the faulty source 35 is ensured by the closure of the valve 36.

We claim:

1. A hydraulic booster device for a braking circuit, comprising a body having a bore in which slides coaxially a plunger controlled by a brake pedal and piston means located between first and second chambers containing brake fluid, the first chamber having a spring which maintains the plunger and the piston means separated one from the other, the first and second chambers being connected respectively to sources of low pressure and high pressure fluid by first and second valve means, respectively, third and fourth valve means being interposed between the first and second chambers, and a braking circuit, characterized in that the high pressure fluid source controls the opening of the first and second valve means which close in the event of failure of the high pressure fluid source in order to isolate the first chamber from the low pressure fluid source and the second chamber from the high pressure fluid source, the second chamber then emptying, in the event of braking, into the braking circuit due to action of the piston means which is displaced by the spring and a translation of the plunger, and in that the third valve means opens once the second chamber is empty to permit transmission into the braking circuit of a volume of brake fluid expelled from the first chamber by a continuation of movement of the plunger due to action of the brake pedal.

2. The device according to claim 1, characterized in that the device comprises fifth valve means which interacts with the first valve means to isolate the first chamber from the low pressure fluid source during braking in the presence of a failure of the high pressure fluid source, the fifth valve means controlling a communication through the plunger and between the first chamber and the lower pressure fluid source, the communication being open in the absence of action on the brake pedal.

3. The device according to claim 2, characterized in that fourth valve means and the fifth valve means are formed by ball valves controlled by needles, the ball valves being mounted respectively in the piston means and in the plunger, a pressure on the brake pedal opening one valve and closing the other valve.

4. The device according to claim 3, characterized in that the fifth ball valve, in the absence of pressure on the brake pedal, is opened by means of a needle which rests against a fixed pin, an opposite end of the needle lifting the fifth ball valve from a seat.

5. The device according to claim 1, characterized in that the third valve means is formed by a third ball mounted on a movable core between a first position where the third ball closes off a channel drilled in a slide valve movable in a sleeve forming part of the piston means, the channel making the braking circuit and the first chamber communicate selectively, and a second position where the third ball is lifted from the channel to authorize a passage of a part of the fluid from the first chamber into the braking circuit during a braking in the presence of a failure of the high pressure fluid source.

6. The device according to claim 5, characterized in that another spring in compression tends to make the slide valve come out of the sleeve which forms part of the piston means.

7. The device according to claim 1, characterized in that the piston means has an annular cup forming a seal in the bore of the body, the cup authorizing the passage of fluid between a wall of the bore and the cup when fluid is transferred from the first chamber to the braking circuit during a braking in the presence of a failure of the high pressure fluid source, the transfer of fluid adding to that determined by the opening of the third valve means.

8. The device according to claim 7, characterized in that the second valve means is an anti-return valve which prevents a return of the fluid contained in the second chamber to the high pressure fluid source.

9. The device according to claim 7, characterized in that the first valve means is formed by a valve controlled a communication between the first chamber and the source of low pressure fluid, the valve closing in the event of failure of the high pressure fluid source.

10. The device according to claim 1, characterized in that a second spring in compression is located in the second chamber, the second spring opposing the action of the spring of the first chamber acting on the piston means which has a greater stiffness than that of the second spring.

11. The device according to claim 10, characterized in that an end of the plunger is covered by a cap on which a bottom of the spring of the first chamber rests, a third spring of greater stiffness to that of the spring of the first chamber being located in the cap to load the cap apart from the end of the plunger.

* * * * *